United States Patent [19]

Mohr

[11] Patent Number: 4,783,577
[45] Date of Patent: Nov. 8, 1988

[54] THREE SERVICE RECESSED AFTERSET

[75] Inventor: Gregory L. Mohr, Marietta, Ohio

[73] Assignee: Butler Manufacturing Company, Kansas City, Mo.

[21] Appl. No.: 99,720

[22] Filed: Sep. 22, 1987

Related U.S. Application Data

[63] Continuation of Ser. No. 944,013, Dec. 22, 1986, abandoned.

[51] Int. Cl.$^4$ ............................................. H02G 3/12
[52] U.S. Cl. ..................................................... 174/48
[58] Field of Search .................... 174/48, 49; 52/126.2, 52/221

[56] References Cited

U.S. PATENT DOCUMENTS 3,322,442  5/1967  Flachbarth ...................... 52/221 X
3,873,136  3/1975  Curry .............................. 174/48 X
4,443,654  4/1984  Flachbarth et al. ................ 174/48
4,591,656  5/1986  Mohr ................................. 174/48
4,638,115  1/1987  Benscoter .......................... 174/48

Primary Examiner—Arthur T. Grimley
Assistant Examiner—David A. Tone
Attorney, Agent, or Firm—Frederick J. Olsson

[57] ABSTRACT

Afterset to access each cell of a three-cell cellular raceway. Comprises a base conected to and extending across the three raceways, an adjusting ring threaded on the base and a flat cover on the adjusting ring. Cover and ring are arranged so that the size of the cable exit opening can be adjusted to fit the cross sectional size of the group of cables. All power, telephone, and data connectors are joined inside the afterset underneath the floor covering.

8 Claims, 3 Drawing Sheets

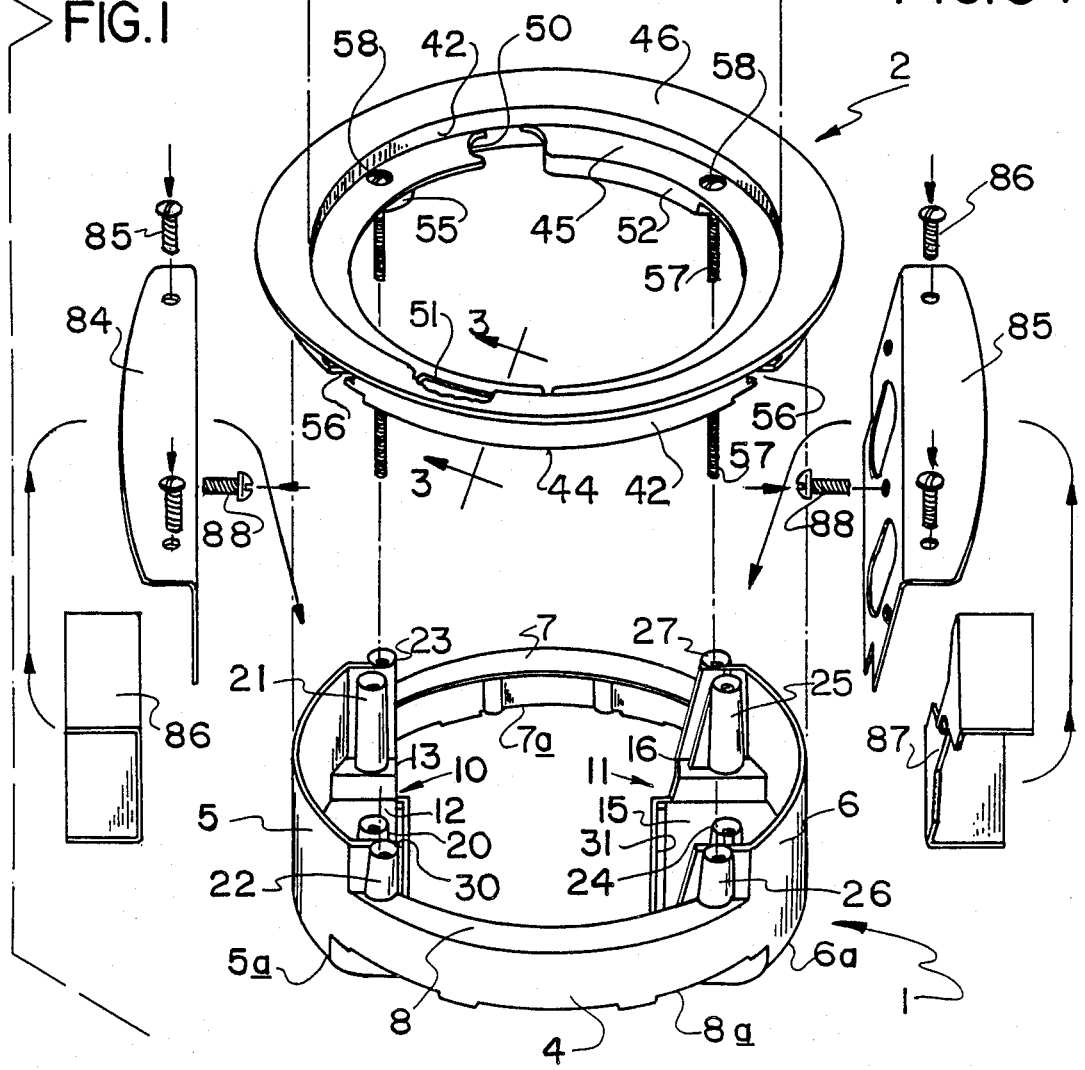

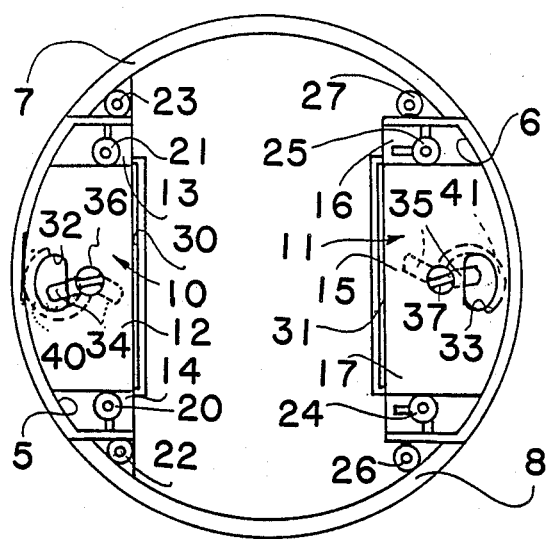
FIG. 4
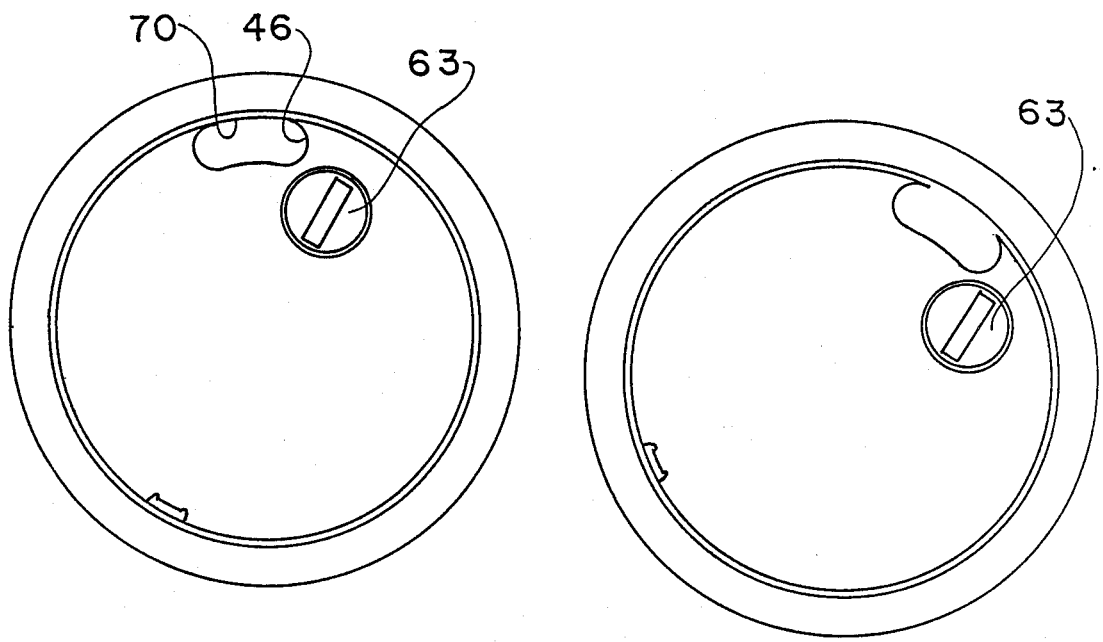
FIG. 5
FIG. 6

THREE SERVICE RECESSED AFTERSET

This application is a continuation of application Ser. No. 944,013 filed Dec. 22, 1986 and now abandoned.

This invention relates in general to electrical in-floor power and communication distribution systems for office buildings and the like and particularly to afterset means for activating the cells of a three-cell cellular raceway.

The invention contemplates an afterset which provides for accessing each cell of a three-cell cellular raceway from a single location on the floor surface and thereby avoiding the use of three single service aftersets.

Further, the invention contemplates an afterset of the kind in question providing for low manufacturing and installation costs by that the unit comprises three main parts two of which are designed so each can be completely fabricated by die casting and the third designed to be completely fabricated by stamping and by that the main parts are arranged to facilitate quick and easy installation of the afterset.

Additionally, the invention contemplates an afterset of the kind in question having an exit opening for the passage of power and communication cables which can be expanded or contracted to fit the cross-sectional size of the cable group employed to thereby make the size of the exit opening compatible with the service provided and eliminate undesirable open space.

Moreover, the invention contemplates an afterset of the kind in question providing for recessed activation by that the connection of the power plugs with the receptacles, the joining of the telephone amphenol connectors, and the joining of other communication jacks are all made in the insert below the floor surface and floor covering with only the cables extending out into the room.

Lastly, the afterset of the invention is readily adaptable for use with both tile and carpet floor coverings and as to carpet covering, the unit may be employed with and without a carpet ring.

The preferred form of the afterset will be described below in connection with the following drawings wherein:

FIG. 1 is an exploded view of one form of the afterset;

FIG. 2 is a view taken along the lines 2—2 of FIG. 1;

FIG. 3 is a view taken along the lines 3—3 of FIG. 1;

FIG. 3A is a fragmentary perspective view taken generally in the area crossed by the lines 3—3 of FIG. 1;

FIG. 4 is a plan view of the base component of the afterset of FIG. 1;

FIG. 5 is a plan view of the open position of the cover component of the afterset of FIG. 1;

FIG. 6 is a plan view of the closed position of the cover component of the afterset of FIG. 1;

Figure 7:
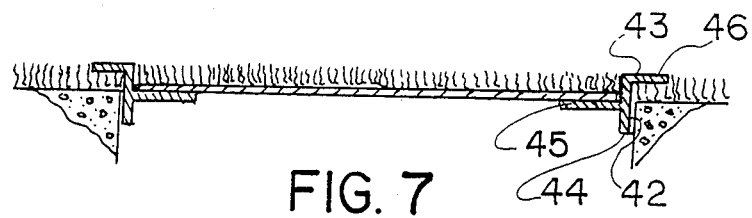
FIG. 7 is a fragmentary, diagramatic, in-floor sectional view of the cover and adjusting ring components of FIG. 1 for carpet installation with the adjusting ring having a carpet flange.

As will be noted in more detail later, the afterset shown in FIG. 1 is for use in being connected to a cellular raceway having a center power cell and communication cells on opposite sides of the power cell. With that in mind, we will now describe the structure of the afterset.

The afterset has three main components, namely, the annular base 1, annular adjusting ring 2, and round, flat cover 3. The base 1 and adjusting ring are die cast parts. The cover 3 is a stamped part.

I will first describe the structure of the base 1.

The base 1 has a main ring 4 with walls 5 and 6 and connecting sections 7 and 8 which are respectively diametrically opposed. A pair of extensions 10 and 11 are disposed adjacent the walls 5 and 6 of the main ring 4 and extending inwardly. The extension 10 has a foot section 12 and side sections 13 and 14, the latter being shown in FIG. 4. The extension 11 has a foot section 15 and side sections 16 and 17.

The bottom edges 5a and 6a of the walls 5 and 6 are lower or off-set from the bottom edges 7a and 8a of the connecting sections 7 and 8. The foot sections 12 and 15 extend inwardly respectively from the bottom edges 5a and 6a and, therefore, are off-set downwardly from edges 7a and 8a. The reason for the off-set will be explained later.

Adjacent the side sections 13 and 14 are a pair of inboard standards 20/21 and a pair of outboard standards 22/23, each of which has a threaded, vertically extending hole for receiving screw threads. Adjacent the side sections 16 and 17 are a pair of outboard standards 26/27 and a pair of inboard standards 24/25 each of which has a threaded, vertically extending hole for receiving screw threads. The threaded holes in the inboard standards 20/21 and 24/25 are for receiving hold-down screws for receptacle brackets. The threaded holes in outboard standards 22/23 and 26/27 receive adjusting screws supporting the adjusting ring 2.

Along the inner edges of the foot sections 12 and 15 are slots 30 and 31 which are for receiving and retaining the bottom ends of receptacle brackets as will be noted later.

As best noted in FIG. 4, the foot sections 12 and 15 are provided with power apertures 32 and 33 which, when the base is installed on a cellular raceway, are aligned with openings in the power cell and provide a passageway for power conductors from the cell into the base.

The foot sections 12 and 15 are each provided with locking means which function to secure the base to the cellular raceway. Referring to FIG. 4, this takes the form of locking tabs 34 and 35 both of which are respectively disposed on the underside of the foot section 12 and the foot section 15. The tabs 34 and 35 are respectively threaded on screws 36 and 37, the heads of which bear on the top side of foot sections 12 and 15. The lower end of each screw is staked over so that the screw/tab cannot be uncoupled.

Semi-circular abutments 40 and 41 respectively extend down from the underside of the foot sections. With respect to each abutment, the downward extension is great enough so that when the tab is at the lowermost point on its screw, rotation of the screw will cause the tab to engage one of the ends of the abutment. For example, if screw 36 is rotated clockwise, the tab will engage and assume the position indicated by the dotted lines 34 and if the screw 36 is rotated counterclockwise, the tab will assume the position shown by the full line. The full-line position is for placing the base on the cellular raceway and the dotted line position is for locking the base to the raceway as will be explained later.

On the foot section 15, the tab 35, screw 37, and abutment 41 function in the same manner as above described.

I will now describe the structure of the adjusting ring 2.

The adjusting ring 2 has an outer wall 42 with top edge 43 and bottom edge 44. A support flange 45 extends inwardly from the outer wall 42. A trim or protective flange 46 extends outwardly from the edge 43. The support flange 45 has a cable exit slot 50 and a tab slot 51 (FIG. 3-A) which are angularly spaced apart. A locking track 52 is on the underside of flange 45. The end 53 of the tab slot 51 serves as an abutment defining a cover-closed position and the end 54 serves as an abutment defining a cover-open position.

The outer wall 42 has four thickened sections which extend inwardly under the support flange 45, one of which is indicated at 55. Each thickened section has a T-shaped slot (see slots 56) which accepts the head of an adjusting screw 56. The screws downwardly extend through the slots 56 and the heads engage the top side of the slots for supporting the ring. The screws 56 are adapted to mate with the threads in the standards 22, 23, 26, and 27. The heads of the screws 56 are accessible for turning through apertures 58 in the support flange 45.

I will now describe the cover 3 and its mounting on the adjusting ring 2.

The cover 3 is supported on the support flange 45. The periphery of the cover is closely adjacent the outer wall 42. The cover makes a slidable or rotatable engagement with the flange 45 and wall 42. The cover includes a cable exit slot 60 open at the periphery of the cover. As noted below, the effective cable passage area of the slot can be changed to suit the cross-sectional size of the cable group. The cover also has a tab 61 angularly spaced from the slot 60 and off-set downwardly from the underside of the cover by the leg 62. When the cover is supported on the flange 45, the leg 62 (as best seen in FIG. 3) extends into the tab slot 51 and the tab 61 extends under the outer wall 42 in sliding engagement with the bottom edge 44. Also, when the cover is on the flange 45, the cable exit slot 60 in the cover and the cable exit slot 50 in the flange 45 are in juxtaposition for the cover to be movable as between open, closed, and intermediate position to expand or contract the size of the cable exit opening as will be explained shortly. The slots 50 and 60 are the same length.

The cover has means for securing the same in any of the above mentioned positions. Referring particularly to FIG. 2, the securing means include a finger-operated button 63 disposed in a depression 64 on the cover and having a shaft 65 extending downwardly through an aperture in the bottom of the depression where it is joined to an arm means 66. A spring 67 between the buton and the bottom of the depression normally raises the arm means upwardly so that it engages the depression. By grasping the button 63 between the fingers, the same can be rotated to cause the arm means 66 to correspondingly rotate.

As shown in FIG. 1, the button 63 is oriented so that the arm 66 is spaced away from the locking track 52. After the cover is positioned as desired the button 63 is rotated until the arm engages the locking track 52 and then it is pushed downwardly against the force of the spring 67 and the button further rotated until the arm moves under the bottom edge of the track 52. When the button is released, the spring will cause the arm to firmly grip the track 52 and the cover will be held in position. The button is provided with a small indicator to indicate the rotational position of the arm 66. In locked condition, the button is flush with the cover.

The cover-closed and cover-open positions are respectively shown in FIGS. 5 and 6.

In the cover-open position, the leg 62 engages the slot end 54 and the cable exit slot 60 in the cover and the cable exit slot 50 in the flange 45 are in vertical alignment to provide a cable passageway of maximum cross section; i.e. the length of the aligned slots.

In the cover-closed position, the leg 62 engages the slot end 53 and the cable exit slot 60 in the cover is aligned with the flange 45 which eliminates the cable passageway.

It will be evident that the cover can be rotated to any of a plurality of positions wherein the cable exit slot 60 in the cover is partially aligned with the cable exit slot 50 in the flange, and also partially aligned with the flange so as to provide a cable passageway of less than the maximum cross section.

Figure 10:
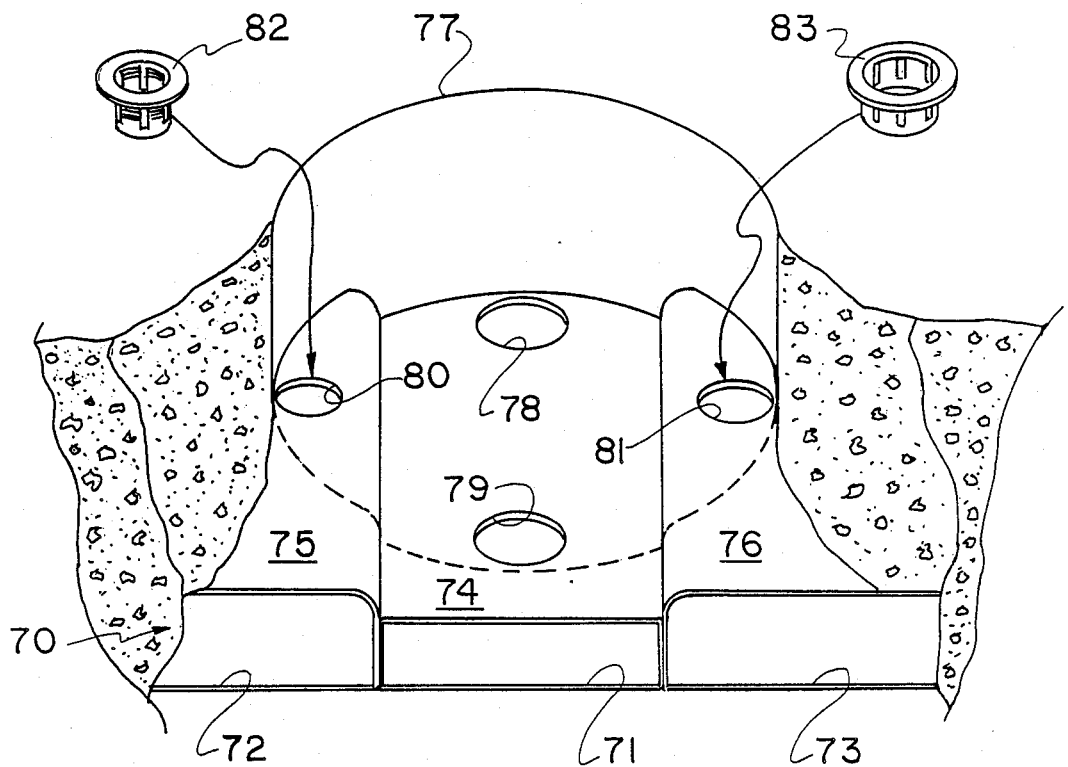
FIG. 10 is a perspective view to illustrate installation of the afterset.

Referring to FIG. 10, I will now comment on the installation of the preset in a concrete floor The cellular raceway 70 indicated in FIG. 10 has a power cell 71 and communication cells 72 and 73 on opposite sides thereof. The crest 74 of the power cell is lower than the crests 75 and 76 of the communication cells. The particular construction raceway 70 requires the offset of the foot sections 12 and 15 previously mentioned. It will be understood, of course, that the preset is adaptable for cellular raceway wherein the crests are flush by eliminating the offset condition.

After the locations of the power cell and the location of the afterset are determined, a bore is core-drilled in the concrete such as the bore indicated at 77. Using an appropriate template, power access holes 78 and 79 are drilled in crest 74 and communication access holes 80 and 81 are drilled in crests 75 and 76. Grommets 82 and 83 are inserted in holes.

Referring to FIG. 4, the tabs 34 and 35 on the bore 1 are rotated to the full-line position and the base 1 placed in the bore so that the power apertures 32 and 33 are aligned with the access holes 78 and 79. The tabs 34 and 35 are rotated to the dotted-line position and in doing so, the tabs swing under the crest 74 of the power cell. With further turning of the screws 36 and 37, the tabs ride up the screws and firmly engage the underside of the crest 74 of the power cell. The base is now locked in position At this point power conductors are brought up through the power apertures 32 and 33 and wired to receptacles. The receptacle/conductor assembly is mounted as noted following.

Referring back to FIG. 1, duplex receptacle brackets are indicated at 84 and 85 and insulators are indicated at 86 and 87.

Each insulator is positioned on the rear wall of its bracket. A duplex receptacle is butted up against the insulator and held in position by screws 88.

Each receptacle/insulator/bracket/conductor assembly is then moved down so that the conductors pass through the power apertures and the bracket 84 is positioned on the inboard standards 20 and 21 with the lower edge in slot 30 and the bracket 85 is positioned on the inboard standards 24 and 25 with the lower edge in slot 31. The brackets 84 and 85 are then secured in position by screws 85 and 86.

Figure 8:
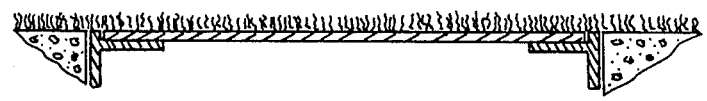
FIG. 8 is a fragmentary, diagramatic, in-floor sectional view of the cover and adjusting ring components for carpet installation without the adjusting ring having a carpet flange.
Figure 9:
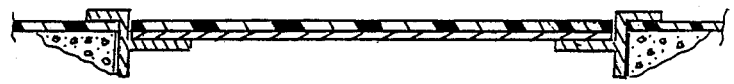
FIG. 9 is a fragmentary, diagramatic, in-floor sectional view of the cover and adjusting ring components for tile installation with the adjusting ring having a tile flange.

The base 1 is now ready to receive the adjusting ring 2. This is accomplished by threading the screws 57 into the threaded holes in the standards 22/23 and 26/27. The ring is adjusted to the appropriate level depending upon the type of installation; i.e. carpet with flange (FIG. 7), carpet flush (FIG. 8) or tile with flange.

The telephone cable from one of the communication cells is connected to one part of an Amphenol connector and a data cable from the other communication cell is connected to one part of a jack-type connector.

The power cables with plugs, the telephone cable with the other part of the Amphenol, and the data cable with the other part of the connector are brought through the adjusting ring and plugged into their respective counterparts.

The several cables are then bunched together and placed on the exit slot 50. The cover 3 is now put into place with the several cables positioned in the cover exit slot 60. The cover is then rotated to leave minimum open space and then locked into position.

I claim:

1. A base for a triple service recessed afterset insert to be inserted in a bore in a concrete floor and connected to a cellular raceway having a center power cell and communication cells on opposite sides of the power cell, the base comprising:
    a main ring;
    a pair of extensions diametrically disposed on opposite sides of the ring and extending inwardly of the main ring;
    each said extension including a foot section adjacent the bottom of the main ring and a pair of side sections on opposite sides of the foot section;
    a power aperture formed in each said foot section for use in receiving power conductors from a power cell;
    a locking tab on the underside of each said foot section for securing the base assembly to said power cell;
    for each said locking tab, a screw located adjacent the power aperture in its foot section, the head of the screw bearing on the top side of its foot section and the bottom of the screw being joined to the locking tab whereby the screw can rotate the tab in opposite directions for use in engaging the tab with the underside of said power cell;
    in each foot section, an elongated slot adjacent the inner edge of the foot section for receiving an edge of a receptacle bracket;
    for each foot section, abutment means on the underside of the foot section to limit the rotation of the tab in said opposite directions; and
    adjacent each said side section means for receiving an adjusting screw for supporting an adjusting ring.

2. The base of claim 1 wherein the foot section in each extension is off-set downwardly.

3. The base of claim 1 wherein adjacent each said side section, means are provided for receiving a hold-down screw for securing a receptacle bracket.

4. The combination of an adjusting ring and a flat cover assembly for a triple service recessed afterset:
    the adjusting ring having an outer wall with a bottom edge and a top edge;
    a flat support flange on said outer wall and extending inwardly thereof;
    a cable exit slot formed in said flange;
    a tab slot formed in said flange and spaced from said cable exit slot, the opposite ends of the tab slot constituting respectively a cover-closed position and a cover-open position;
    the flat cover being mounted on said support flange for rotation thereof, the outer periphery of the cover being closely adjacent said inner wall;
    an open cable exit slot formed on the periphery of said cover;
    a tab formed on said cover and extending into said tab slot and under said outer wall in sliding engagement with the bottom edge thereof;
    the cover being rotatable as between a cover-open position and a cover-closed position and to any of a plurality of partially open positions;
    said open position being defined by that the cable exit slot on the cover and the cable exit slot on the flange are aligned with one another to provide a cable passageway of maximum cross section;
    said closed position being defined by that the cable exit slot on the cover is aligned with said flange to close off said cable passageway;
    each of said partially open positions being defined by that the cable exit slot on the cover is partially aligned with the cable exit slot in the flange and also partially aligned with flange to provide a cable passageway of less than maximum cross-section; and
    means connectable between the cover and the ring to releasably lock the cover in any of said positions.

5. The assembly of claim 4 further including a protective flange extending outwardly from the top edge of said outer wall.

6. The assembly of claim 4 wherein the means to releasably lock said cover in any of said positions comprises:
    a locking track formed on said flange;
    and a lock button having a head in a depression in said cover and a shaft extending through an aperture in said cover, arm means surrounding said shaft and extending outwardly therefrom, a spring between the head and the bottom of the depression causing the arm means to slidingly engage the underside of the depression, the button being rotatable for engaging the arm with said locking track in any of said positions.

7. In an afterset insert:
    a main ring configured to be mounted on a cellular raceway having at least a power cell;
    a pair of extensions diametrically disposed on opposite sides of the ring and extending inwardly of the main ring;
    each said extension including a foot section adjacent the bottom of the main ring and a pair of side sections on opposite sides of the foot section;
    an aperture formed in each said foot section;
    a locking tab on the underside of each said foot section for securing the main ring to said power cell;
    for each said locking tab, a screw located adjacent the aperture in its foot section, the head of the screw bearing on the top side of its foot section and the bottom of the screw being joined to the locking tab whereby the screw can rotate the tab in opposite directions for use in engaging the tab with the underside of said power cell;

for each foot section, abutment means on the underside of the foot section to limit the rotation of the tab in said opposite directions;

on each said side section, an outboard standard and an inboard standard respectively extending upwardly therefrom and each standard having a threaded hole extending inwardly from the top thereof, the threads of the outboard standards being for use in receiving screws for supporting an adjusting ring;

an adjusting ring;

adjusting screws respectively threaded in the threads of said outboard standards and supporting said adjusting ring; and cover means rotatably mounted on said adjusting ring.

8. In an afterset insert:

a main ring configured to be mounted on a cellular raceway having at least a power cell;

a pair of extensions diametrically disposed on opposite sides of the ring and extending inwardly of the main ring;

each said extension including a foot section adjacent the bottom of the main ring and a pair of side sections on opposite sides of the foot section;

a power aperture formed in each said foot section for use in receiving power conductors from a power cell;

a locking tab on the underside of each said foot section for securing the main ring to said power cell;

for each said locking tab, a screw located adjacent the power aperture in its foot section, the head of the screw bearing on the top side of its foot section and the bottom of the screw being joined to the locking tab whereby the screw can rotate the tab in opposite directions for use in engaging the tab with the underside of said power cell;

for each foot section, abutment means on the underside of the foot section to limit the rotation of the tab in said opposite directions;

in each foot section, an elongated slot adjacent the inner edge of the foot section for receiving an edge of a receptacle bracket;

on each said side section, an outboard standard and an inboard standard respectively extending upwardly therefrom and each standard having a threaded hole extending inwardly from the top thereof, the threads of the outboard standards being for use in receiving screws for supporting an adjusting ring and the threads of the inboard standards being for use respectively in receiving screws for securing receptacle brackets;

an adjusting ring;

adjusting screws respectively threaded in the threads of said outboard standards and supporting said adjusting ring;

cover means rotatably mounted on said adjusting ring;

a pair of receptacle brackets the lower edges of which are respectively mounted in said elongated slots and upper edges of which respectively engage said inboard standards; and screws respectively securing the upper edges of the receptacle brackets to said inboard standards.

* * * * *